United States Patent
Hajost

(10) Patent No.: US 9,940,115 B2
(45) Date of Patent: *Apr. 10, 2018

(54) MOBILE APPLICATION DEPLOYMENT FOR DISTRIBUTED COMPUTING ENVIRONMENTS

(71) Applicant: SteelCloud, LLC, Ashburn, VA (US)

(72) Inventor: Brian H. Hajost, Great Falls, VA (US)

(73) Assignee: STEELCLOUD, LLC, Ashburn, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/450,164

(22) Filed: Mar. 6, 2017

(65) Prior Publication Data

US 2017/0177316 A1 Jun. 22, 2017

Related U.S. Application Data

(63) Continuation of application No. 14/100,732, filed on Dec. 9, 2013, now Pat. No. 9,621,596, which is a continuation-in-part of application No. 12/880,072, filed on Sep. 11, 2010, now Pat. No. 8,620,998.

(51) Int. Cl.
| | |
|---|---|
| *G06F 15/16* | (2006.01) |
| *G06F 9/445* | (2018.01) |
| *H04L 29/06* | (2006.01) |
| *G06F 21/51* | (2013.01) |
| *G06F 9/44* | (2018.01) |

(52) U.S. Cl.
CPC .......... *G06F 8/60* (2013.01); *G06F 8/71* (2013.01); *G06F 21/51* (2013.01); *H04L 63/205* (2013.01); *G06F 2221/033* (2013.01)

(58) Field of Classification Search
CPC . H04L 63/205; G06F 8/60; G06F 8/71; G06F 21/51
USPC .................................................. 709/200, 203
See application file for complete search history.

(56) References Cited

U.S. PATENT DOCUMENTS

| | | | |
|---|---|---|---|
| 7,627,658 B2 * | 12/2009 | Levett ....................... | G06F 9/46 709/203 |
| 9,202,050 B1 * | 12/2015 | Nachenberg ............ | G06F 21/56 |

(Continued)

*Primary Examiner* — Anthony Mejia
(74) *Attorney, Agent, or Firm* — Steven M. Greenberg, Esq.; CRGO Law

(57) ABSTRACT

Embodiments of the present invention provide a method, system, and computer program product for ensuring the veracity of a mobile application for deployment in a distributed computing environment. In an embodiment of the invention, a method for ensuring the veracity of a mobile application for deployment in a distributed computing environment is provided. The method includes detecting a mobile application being uploaded for deployment to a mobile computing device in the distributed computing environment, creating and then storing a fingerprint for the uploaded mobile application, calculating an offset value according to the fingerprint for the uploaded mobile application, and storing the offset value for the uploaded mobile application. The method further includes, prior to deploying the uploaded mobile application to the mobile computing device, validating the offset value for the uploaded mobile application to determine that the uploaded mobile application is an unaltered version of the uploaded mobile application.

20 Claims, 2 Drawing Sheets

(56) References Cited

U.S. PATENT DOCUMENTS

| | | | |
|---|---|---|---|
| 2007/0143446 A1* | 6/2007 | Morris | G06F 8/61 709/219 |
| 2010/0088367 A1* | 4/2010 | Brown | G06F 8/60 709/203 |
| 2011/0083164 A1* | 4/2011 | Benantar | H04L 63/104 726/4 |
| 2012/0005283 A1* | 1/2012 | Provo | G06Q 10/10 709/206 |
| 2012/0066287 A1 | 3/2012 | Hajost | |
| 2014/0101717 A1 | 4/2014 | Hajost | |
| 2014/0108590 A1* | 4/2014 | Hunt | G06F 8/61 709/217 |
| 2014/0372998 A1* | 12/2014 | Salameh | G06F 8/65 717/169 |
| 2016/0154853 A1* | 6/2016 | Sax | G06F 17/30 707/747 |

* cited by examiner

MOBILE APPLICATION DEPLOYMENT FOR DISTRIBUTED COMPUTING ENVIRONMENTS

CROSS-REFERENCE TO RELATED APPLICATIONS

This application is a Continuation of U.S. patent application Ser. No. 14/100,732, filed on Dec. 9, 2013, now U.S. Pat. No. 9,621,596, which is a Continuation-in-Part of U.S. application Ser. No. 12/880,072, filed on Sep. 10, 2010, now U.S. Pat. No. 8,620,998, which are incorporated herein by reference in their entirety.

BACKGROUND OF THE INVENTION

Field of the Invention

The present invention relates to computer program deployment and, more particularly, to mobile application deployment to pervasive computing devices in a distributed computing environment.

Description of the Related Art

Integral to the successful implementation of a computer software development project is the ultimate deployment of a fully functioning computing system. Early forms of computing systems involved a single computer program executing in the memory of a single computer. The rise of computer networks in general industry resulted in the expansion of the traditional computing system from the single computer to a client-server architected computing system in which many different computing clients, individually executing a computer program, access program data through one or more coupled host servers. The explosion of Internet computing has further complicated matters resulting in complex computing arrangements, in which logic for a computing system resides and executes across a multiplicity of end user computing devices and remote servers.

The accessibility of the Internet has facilitated the growth and popularity of distributed computing models. In a distributed computing model, substantial processing can be pushed to host servers geographically closest to the end user. One or more controllers determine when program logic or data is best served from a particular remote server for the benefit of a particular end user or class of end users. Given the complexity of the distributed computing architecture, deploying an application into a distributed architecture can be equally as complicated—particularly where access policies determine whether or not an individual end user or class of end users is permitted to deploy a given application onto a given computing device.

The problem of application deployment into a distributed computing environment is most prevalent in a distributed computing environment supporting a multiplicity of pervasive end user mobile devices such personal digital assistants and smart phones. At present, the most popular methodology for application deployment to pervasive devices mimics the ad hoc distribution model. In the ad hoc distribution model, individual end users connect to a remote server providing a menu of applications available for deployment over the Internet to respective pervasive mobile devices. However, there is no way to ensure that the application an individual end user has downloaded and installed to a pervasive end user mobile device is the same application governed by access policies.

BRIEF SUMMARY OF THE INVENTION

Embodiments of the present invention address deficiencies of the art with respect to mobile application deployment to pervasive mobile devices and provide a novel and non-obvious method, system and computer program product for ensuring the veracity of a mobile application for deployment in a distributed computing environment. In an embodiment of the invention, a method for ensuring the veracity of a mobile application for deployment in a distributed computing environment is provided. The method includes detecting a mobile application being uploaded for deployment to a mobile computing device in the distributed computing environment, creating a fingerprint for the uploaded mobile application, calculating an offset value according to the fingerprint for the uploaded mobile application, and storing the offset value and the fingerprint for the uploaded mobile application. The method can further include, prior to deploying the uploaded mobile application to the mobile computing device, validating the offset value for the uploaded mobile application to determine that the uploaded mobile application is an unaltered version of the uploaded mobile application.

In another embodiment of the invention, a mobile application deployment data processing system is provided. The system includes different intermediate servers, each separately programmed to synchronize messages, calendaring and contacts between wirelessly linked pervasive mobile devices and an associated messaging server. The system also includes different distributed mobile application repositories, each coupled to a different one of the intermediate servers. The system yet further includes a secure mobile application repository storing multiple different mobile applications and coupled to the distributed mobile application repositories over a computer communications network. Finally, the system includes auto-synchronization logic executing in memory of a computer coupled to the secure mobile application repository. The logic includes program code enabled to detect the plurality of mobile applications being uploaded for deployment to a pervasive mobile device in a distributed computing environment, to create a fingerprint for the uploaded plurality of mobile applications, to calculate an offset value according to the fingerprint for the uploaded plurality of mobile applications, to store the offset value and the fingerprint for the uploaded plurality of mobile applications in the secure mobile application repository, and to validate the offset value for the uploaded plurality of mobile applications, prior to deploying the uploaded plurality of mobile applications to the pervasive mobile device.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the invention provide for ensuring the veracity of a mobile application for deployment in a distributed computing environment. In accordance with an embodiment of the invention, a mobile application for use in a pervasive mobile device can be uploaded to a mobile application repository. A fingerprint for the mobile application can be determined and stored for the mobile application as it enters the workflow. The fingerprint can indicate the components of the mobile application used to calculate an offset. Further, the offset according to the fingerprint for the mobile application can be calculated and recorded so that any process along the workflow can recalculate the offset and compare it to the recorded offset. In this way, the application can be validated to ensure the mobile application is the same as was uploaded to the mobile application repository and has not been tampered with or replaced along the workflow process, and thus, remains unaltered.

Figure 1:
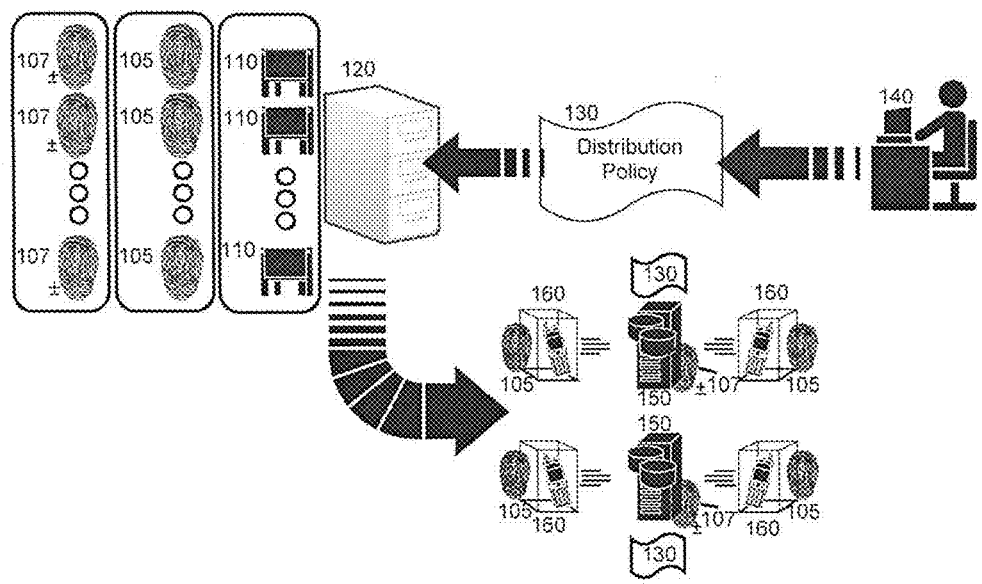
FIG. 1 is an illustration of a process for ensuring the veracity of a mobile application for deployment in a distributed computing environment.

In further illustration, FIG. 1 is a pictorial illustration of a process for ensuring the veracity of a mobile application for deployment in a distributed computing environment. As shown in FIG. 1, different mobile applications 110 can be uploaded to and stored in a secure central repository 120 disposed behind a firewall in a computer communications network. In addition, a fingerprint 105 can be created for each different mobile application 110 and can also be stored in a secure central repository 120.

The fingerprint 105 can indicate the components of the mobile application 110 used to calculate an offset value 107. In other words, the fingerprint 105 describes which components of the uploaded mobile application 110 are used to calculate the offset value 107; the fingerprint 105 serves as a guide as to how the offset value is calculated. Components of the uploaded loaded mobile application 110 can include metadata of the mobile application 110, such as, but not limited to the version of the uploaded mobile application 110, the date that the mobile application 110 was uploaded, the time that mobile application 110 was uploaded, etc. as well as whether a hash of the mobile application 110, metadata of the mobile application 110, or a combination of both a hash and metadata should be used to create the offset value 107.

An offset value 107 can be calculated according to the fingerprint 105 and stored in the secure central repository 120. The offset value 107 can be calculated in multiple, different ways. In an embodiment, the offset value 107 can be calculated according to a hash of the mobile application 110. In a different embodiment, the offset value 107 can be calculated based upon metadata of the mobile application 110. In yet a different embodiment, the offset value 107 can be calculated by combining the calculated hash value and the calculated offset value to create a singular offset value 107.

A distribution policy 130 can be centrally maintained by an administrator 140 in connection with the mobile applications 110 stored in the secure central repository 120. Specifically, the distribution policy 130 can specify criteria requisite to permit or deny access to the different mobile applications 110 when deploying the different mobile applications 110 to respectively different pervasive mobile devices 160. Of note, the mobile applications 110 can be deployed to the respectively different pervasive mobile devices 160 in a distributed computing environment. In the distributed computing environment, distributed mobile application repositories 150 can be coupled to different groupings of the pervasive mobile devices 160. As such, end users of the pervasive mobile devices 160 can request deployment of a selected one of the mobile applications 110 not from the secure central repository 120, but from a coupled one of the distributed mobile application repositories 150 by way of an intermediate server charged with synchronizing messages, calendaring and contacts between the pervasive mobile devices and an associated messaging server. The distributed mobile application repositories 150 can also store the offset value 107.

However, the deployment of a selected one of the mobile applications 110 can be limited according to terms of the distribution policy 130 managed centrally by the administrator 140 and distributed to each of the distributed mobile application repositories 150. In this way, the integrity and validity of mobile applications 110 uploaded into the secure central repository 120 can be assured while limiting access to both the mobile applications 110 and the distribution policy 130 behind the firewall and while permitting scalability afforded by the distributed computing environment without requiring tedious, manual maintenance of the distribution policy 130 at each of the distributed application repositories 150.

Further, after the mobile application 110 is distributed to each of the pervasive mobile devices 160, the fingerprint 105 of the mobile application 110 can be retrieved from the secure central repository 120 and the offset value 107 corresponding to the stored fingerprint 105 can be calculated and subsequently validated. The offset value 107 can be validated by comparing the offset value 107 of the mobile application 110 stored in the secure central repository 120 to the offset value 107 calculated on the pervasive mobile device 160. Of note, the offset value 107 can optionally be validated after the distributed mobile application repository 150 retrieves the mobile application 110, but before the mobile application 110 is deployed to the pervasive mobile device 160. In this way, it can be determined that the mobile application 110 on the pervasive mobile device 160 is authentic—the mobile application 110 is the same as was uploaded to the central repository 120 or downloaded to the distributed mobile application repositories 150. In other words, it can be determined that neither the mobile application 110 nor the pervasive mobile device 160 has been tampered with or replaced, and thus, both are unaltered.

Figure 2:
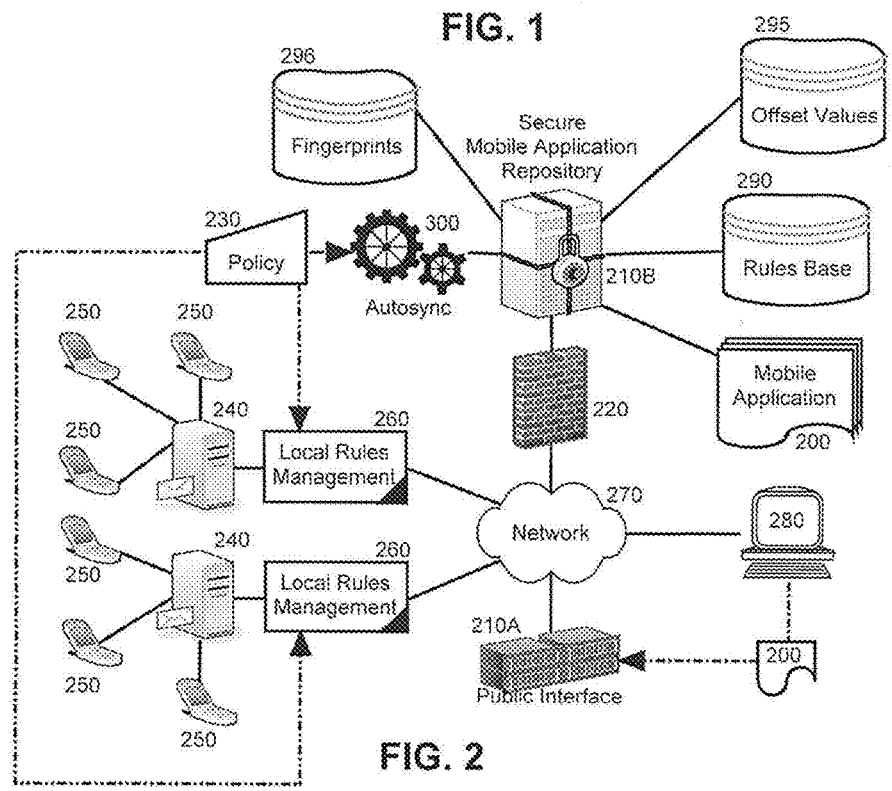
FIG. 2 is a schematic illustration of a mobile application deployment data processing system configured for mobile application deployment in a distributed computing environment; and, FIG. 3 is a flow chart illustrating a process for ensuring the veracity of a mobile application for deployment in a distributed computing environment.

The process described in connection with FIG. 1 can be implemented within a mobile application deployment data processing system. In further illustration, FIG. 2 schematically depicts a mobile application deployment data processing system configured for mobile application deployment in a distributed computing environment. The system can include a secure mobile application repository 210B storing different mobile applications 200 as well as a database 295 storing different offset values and a database 296 storing different fingerprints corresponding to different mobile applications 200. Of note, each database 295, 296 can be separate from the secure mobile application repository 210B or disposed in the secure mobile application repository 210B. In addition, though not pictured, instead of separate databases 295,296, it is contemplated that one database stores both the different fingerprints and the different offset values. The secure mobile application repository 210B can be coupled over computer communications network 270 to multiple different distributed application repositories disposed in or coupled to correspondingly different intermediate servers 240 charged with synchronizing messages, calendaring and contacts with wirelessly linked pervasive mobile devices 250 and an associated messaging server (not shown). In addition, the different distributed application repositories disposed in or coupled to the different intermediate servers 240 can also include the stored offset values and fingerprints for each mobile application 200.

Notably, the secure mobile application repository 210B can be disposed behind a firewall 220 so as to limit access to the secure mobile application repository 210B from over the computer communications network 270. In this regard, an interface 210A to the secure mobile application repository 210B can be provided and rendered accessible to a communicatively coupled terminal 280. The interface 210A can publish a catalog of the mobile applications 200 in the secure mobile application repository 210B. Further, the interface 210A can provide a user interface through which the mobile applications 200 can be uploaded to the secure mobile application repository 210B. The interface 210A also can provide a user interface through which deployment rules limiting deployment of the mobile applications 200 can be created, modified and deleted in a rules base 290 and aggregated into a distribution policy 230.

In accordance with an embodiment of the invention, auto-synchronization (autosync) logic 300 can be coupled to the secure mobile application repository 210B and can execute in memory by at least one processor of a computer. The auto-synchronization logic 300 can detect that a new mobile application 200 has been uploaded to the secure mobile application repository 210B and create a fingerprint for the uploaded new mobile application 200. The fingerprint can be created and/or captured based upon the uploaded mobile application 200 and then stored in the secure mobile application repository 210B, or more specifically, in the fingerprints database 296 coupled to the secure mobile application repository 210B. The fingerprint can indicate the components of the uploaded mobile application 200 used to calculate an offset value. In other words, the fingerprint describes which components of the uploaded mobile application 200 are used to calculate an offset value. (The fingerprint serves as a guide as to how the offset value is calculated.) Components of the uploaded mobile application 200 can include metadata of the mobile application 200, such as, but not limited to, the version of the uploaded mobile application 200, the date that the mobile application 200 was uploaded, the time that mobile application 200 was uploaded, etc. as well as whether a hash of the mobile application 200, metadata of the mobile application 200, or a combination of both a hash and metadata should be used to create the offset value.

The offset value can be calculated in multiple, different ways. In an embodiment, the offset value can be calculated according to a hash of the mobile application 200. In a different embodiment, the offset value can be calculated based upon metadata of the mobile application 200. In yet a different embodiment, the offset value can be calculated by combining the calculated hash value and the calculated offset value to create a singular offset value. For example, the offset value can be created based upon the time the mobile application 200 was uploaded to the secure mobile application repository 210B. Once the offset value is calculated according to the fingerprint, the offset value can be stored in an offset value database 295.

Further, auto-synchronization logic 300 can detect changes to the distribution policy 230 and can forward copies of the distribution policy 230 along with a corresponding offset value for each mobile application 200 to different ones of the distributed application repositories disposed in or coupled to correspondingly different intermediate servers 240. As an alternative or in supplement, the auto-synchronization logic 300 can detect changes to the secure mobile application repository 210B and can forward copies of the distribution policy 230 as well as the offset values to different ones of the distributed application repositories disposed in or coupled to correspondingly different intermediate servers 240. Optionally, in either case, auto-synchronization logic 300 can also forward the fingerprints corresponding to different ones of each mobile application 200 to different ones of the distributed application repositories disposed in or coupled to correspondingly different intermediate servers 240. In all circumstances, a local rules management module 260 for each of the different distributed application repositories can process the distribution policy 230 to determine which of coupled pervasive mobile devices 250 are to receive selected ones of the mobile applications 200 deployed to the different distributed application repositories.

In addition, the selected ones of mobile applications 200 can be deployed to the pervasive mobile devices 250 determined by the distribution policy 230 to receive selected ones of the mobile applications 200. After deployment, in an embodiment, the fingerprint can be retrieved from fingerprint database 296 coupled to the secure mobile application repository 210B. In a different embodiment, the fingerprint can be retrieved from the distributed application repositories disposed in or coupled to correspondingly different intermediate servers 240. In either case, an offset value can be calculated according to the retrieved fingerprint. This calculated offset value can be validated by comparing it to the offset value stored in the distributed application repositories disposed in or coupled to correspondingly different intermediate servers 240 and/or compared to the offset value stored in the offset values database 295 coupled to or disposed in the secure mobile application repository 210B. Of note, it is contemplated that the offset values stored in the offset values database 295 are stored directly in memory of the secure mobile application repository 210B. It is also contemplated that the fingerprints stored in the fingerprint database 296 can be stored directly in memory of the secure mobile application repository 210B. In this way, it can be determined that the mobile application on the pervasive mobile device 250 is the same application that was uploaded to the secure mobile application repository 210B and has not been tampered with or replaced along the way, and thus, is unaltered.

Figure 3:
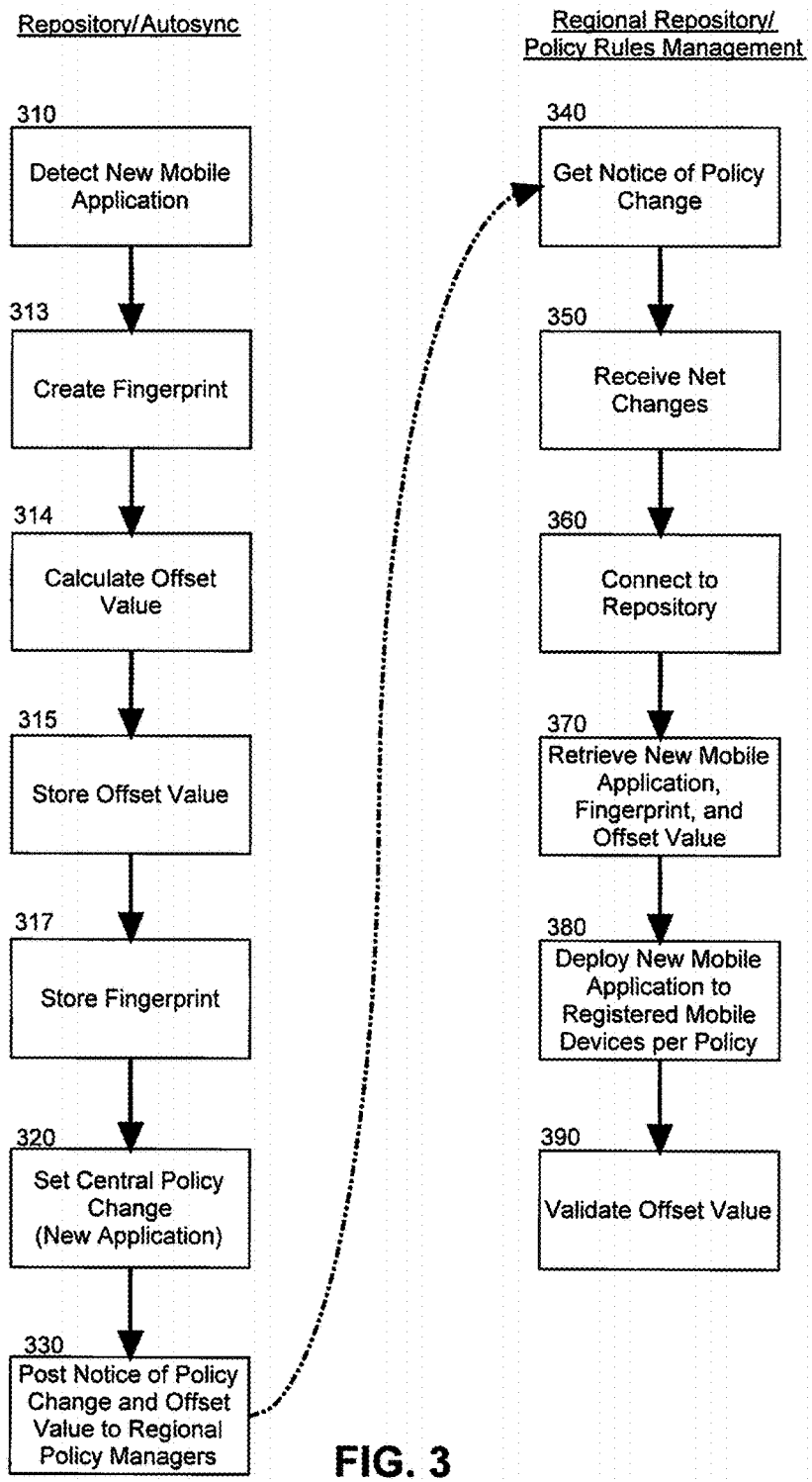

In yet further illustration of the operation of the auto-synchronization logic 300, FIG. 3 is a flow chart illustrating a process for mobile application deployment in a distributed computing environment. The uploading of a mobile application to a secure central mobile application repository can be detected, as illustrated in block 310. In block 313, a fingerprint can be created for the uploaded mobile application and stored in the secure central mobile application repository, as illustrated in block 317. An offset value can be calculated according to the fingerprint, as shown in block 314, and stored, as illustrated in block 315. The offset value can be calculated using metadata corresponding to the uploaded mobile application and/or a serial hash created based upon the mobile application. In order words, the offset value can be determined by calculating a hash value for the uploaded mobile application, by using metadata corresponding to the uploaded application, or a combination of both such that a singular offset value is determined. The offset value can be stored in memory of the secure central mobile application repository or in a database coupled to or disposed within the secure central mobile application repository. In block 320, a distribution policy for the mobile applications disposed in the secure central mobile application repository can be modified to account for the uploaded mobile application. For example, the distribution policy can be modified to specify an identity or classification of an end user permitted to receive deployment of the uploaded mobile application in a corresponding pervasive mobile device. In another example, the distribution policy can be modified to specify requisite computing resources in the corresponding pervasive mobile device for proper operation of the uploaded mobile application.

Once the distribution policy has been modified, in blocks 330 and 340, notice can be provided to the different rules management modules for the distributed application repositories of the change to the distribution policy and the offset value. In response, in block 350, the changes to the distribution policy can be provided to each of the different rules management modules and, as illustrated in block 360, each of the different rules management modules can connect to the secure central mobile application repository to retrieve the uploaded mobile application, the corresponding fingerprint, and the corresponding offset value, as shown in block 370, into correspondingly coupled ones of the distributed application repositories. In block 380, the uploaded mobile application can be deployed along with the corresponding offset value. Of note, the corresponding offset value can come from either or both of the distributed application repository or from the secure central mobile application repository. In addition, the fingerprint from either or both of the secure central mobile application repository or/and the distributed application repositories disposed in or coupled to correspondingly different intermediate servers can be deployed to the registered mobile devices according to the distribution policy.

Finally, the offset value of the deployed mobile application can be validated, as shown in block 390. The offset value of the deployed mobile application can be validated in multiple, different ways. In an embodiment, an offset value can be calculated for the deployed mobile application according to the fingerprint stored on the secure central mobile application repository. In a different embodiment, an offset value can be calculated for the deployed mobile application according to the fingerprint stored in the distributed application repositories disposed in or coupled to correspondingly different intermediate servers. In yet a different embodiment, an offset value can be calculated for the deployed mobile application according to the fingerprint stored on the communicatively linked pervasive mobile device itself.

Regardless of how the offset value is calculated, in an embodiment, the calculated offset value for the deployed mobile application can be compared to the offset value stored in the coupled distributed application repository disposed in or coupled to correspondingly different intermediate servers. In a different embodiment, the calculated offset value for the deployed mobile application can also be compared to the offset value stored in the secure central mobile application repository, which was created upon the mobile application being uploaded to the secure central mobile application repository. In yet a different embodiment, the offset value deployed to the mobile application can simply be compared to either the offset value stored on the secure central mobile application repository or the distributed application repository disposed in or coupled to correspondingly different intermediate servers.

In any case, if the offset values match, the mobile application is the same as was uploaded to the secure mobile application repository. If the offset values do not match, the mobile application has been tampered with (altered) or replaced along the way. If the deployed mobile application has been found to have been tampered with (altered) or replaced, remedial actions can be taken, such as, but not limited to, the inactivation of the deployed mobile application or the reinstallation of the mobile application. In this way, it can be assured that the same mobile application went through the workflow process; therefore, the deployed mobile application is the same mobile application as originally uploaded to the secure mobile application repository.

As will be appreciated by one skilled in the art, aspects of the present invention may be embodied as a system, method or computer program product. Accordingly, aspects of the present invention may take the form of an entirely hardware embodiment, an entirely software embodiment or an embodiment combining software and hardware aspects that may all generally be referred to herein as a "circuit," "module" or "system." Furthermore, aspects of the present invention may take the form of a computer program product embodied in one or more non-transitory computer readable storage medium(s) having computer readable program code embodied thereon.

A computer readable storage medium may be, for example, but not limited to, an electronic, magnetic, optical, electromagnetic, or semiconductor system, apparatus, or device, or any suitable combination of the foregoing. More specific examples of the computer readable storage medium include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device. Further, with specific reference to a computer readable storage medium, it will be understood that a computer readable storage medium excludes transitory media such as transitory signals and other propagation media.

Aspects of the present invention have been described above with reference to flowchart illustrations and/or block diagrams of methods, apparatus (systems) and computer program products according to embodiments of the invention. In this regard, the flowchart and block diagrams in the Figures illustrate the architecture, functionality, and operation of possible implementations of systems, methods and computer program products according to various embodiments of the present invention. For instance, each block in the flowchart or block diagrams may represent a module, segment, or portion of code, which comprises one or more executable instructions for implementing the specified logical function(s).

It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It also will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Finally, the terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to embodiments thereof, it will be apparent that modifications and variations are possible without departing from the scope of the invention defined in the appended claims as follows:

I claim:

1. A method for ensuring the veracity of a mobile application in a mobile computing device deployed as part of a distributed computing environment, comprising:
   requesting, by the mobile computing device, deployment of the mobile application;
   receiving the mobile application over a communications network in the mobile computing device upon a determination that the mobile computing device is eligible to receive the mobile application according to a distribution policy aggregating deployment rules limiting deployment of mobile applications to specific mobile computing devices in the distributed computing environment;
   retrieving from a first database a stored fingerprint detailing both components of the received mobile application required to calculate a new offset value and also how to calculate the new offset value;
   retrieving from a second database a previously stored offset value that had been stored in connection with a previously uploaded mobile application;
   calculating in memory of the mobile computing device the new offset value for the received mobile application based upon the retrieved stored fingerprint; and,
   validating the received mobile application deployed to the mobile computing device by comparing the calculated new offset value with the previously stored offset value to determine whether both offset values match,
   wherein the match between the calculated new offset value and the previously stored offset value indicate that the received mobile application is an unaltered version of the previously uploaded mobile application.

2. The method of claim 1, wherein retrieving from the first database the stored fingerprint comprises retrieving the stored fingerprint from the first database coupled to a central repository.

3. The method of claim 1, wherein retrieving from the first database the stored fingerprint comprises retrieving the stored fingerprint from the first database coupled to a distributed mobile application repository.

4. The method of claim 1, wherein requesting deployment, by the mobile computing device, of the mobile application comprises requesting deployment of the mobile application from a distributed mobile application repository.

5. The method of claim 1, wherein retrieving from the second database the previously stored offset value comprises retrieving the previously stored offset value from the second database coupled to a central repository.

6. The method of claim 1, wherein retrieving from the second database the previously stored offset value comprises retrieving the previously stored offset value from the second database coupled to a distributed mobile application repository.

7. The method of claim 1, wherein calculating in the memory of the mobile computing device the new offset value for the received mobile application based upon the retrieved stored fingerprint comprises calculating a hash value for the received mobile application.

8. The method of claim 1, wherein calculating in the memory of the mobile computing device the new offset value for the received mobile application based upon the retrieved stored fingerprint comprises calculating the new offset value by using metadata of the received mobile application.

9. A system for ensuring the veracity of a mobile application in a mobile computing device deployed as part of a distributed computing environment, comprising:
   a plurality of intermediate servers;
   a plurality of distributed mobile application repositories storing a plurality of mobile applications, each coupled to a different one of the plurality of intermediate servers;
   a plurality of mobile computing devices coupled to both one of the plurality of distributed mobile application repositories and one of the plurality of intermediate servers; and,
   auto-synchronization logic executing in a memory of each one of the plurality of mobile computing devices, the auto-synchronization logic comprising program code which when executed by a processor of a corresponding mobile computing device enables the corresponding mobile computing device to:
   request deployment of the mobile application from one of the plurality of distributed mobile application repositories,
   receive the mobile application over a communications network in the corresponding mobile computing device upon a determination that the corresponding mobile computing device is eligible to receive the mobile application according to a distribution policy aggregating deployment rules limiting deployment of mobile applications to specific mobile computing devices in the distributed computing environment,
   retrieve from a first database a stored fingerprint detailing both components of the received mobile application required to calculate a new offset value and also how to calculate the new offset value,
   retrieve from a second database a previously stored offset value for a previously uploaded mobile application,
   calculate in the memory of the corresponding mobile computing device the new offset value for the received mobile application based upon the retrieved stored fingerprint, and
   validate the received mobile application deployed to the corresponding mobile computing device by comparing the calculated new offset value and the previously stored offset value to determine whether both offset values match,
   wherein the match between the calculated new offset value and the previously stored offset value indicate that the received mobile application is an unaltered version of the previously uploaded mobile application.

10. The system of claim 9, wherein the first database is coupled to one of the plurality of distributed mobile application repositories.

11. The system of claim 9, wherein the second database is coupled to one of the plurality of distributed mobile application repositories.

12. The system of claim 9, further comprising a secure mobile application repository storing a plurality of uploaded mobile applications and coupled to the plurality of distributed mobile application repositories over a computer communications network.

13. The system of claim 12, wherein the first database is coupled to the secure mobile application repository.

14. The system of claim 12, wherein the second database is coupled to the secure mobile application repository.

15. The system of claim 12, wherein the secure mobile application repository and the plurality of distributed mobile application repositories are disposed on opposite ends of a firewall.

16. The system of claim 9, wherein the first database and the second database comprise a single database.

17. A computer program product for ensuring the veracity of a mobile application in a mobile computing device deployed as part of a distributed computing environment, the computer program product comprising:
   a non-transitory computer readable storage medium having a set of instructions embodied therewith that when executed by a processor of the mobile computing device causes the mobile computing device to:
   request deployment of the mobile application;
   receive the mobile application over a communications network upon a determination that the mobile computing device is eligible to receive the mobile application according to a distribution policy aggregating deployment rules limiting deployment of mobile applications to specific mobile computing devices in the distributed computing environment;
   retrieve from a first database a stored fingerprint detailing components of the received mobile application required to calculate a new offset value and also how to calculate the new offset value;
   retrieve from a second database a previously stored offset value for a previously uploaded mobile application;
   calculate the new offset value for the received mobile application based upon the retrieved stored fingerprint; and,
   validate the received mobile application deployed to the mobile computing device by comparing the calculated new offset value and the stored offset value to determine whether both offset values match,
   wherein the match between the calculated new offset value and the previously stored offset value indicate that the received mobile application is an unaltered version of the previously uploaded mobile application.

18. The computer program product of claim 17, wherein the set of instructions that when executed by the processor of the mobile computing device causes the mobile computing device to calculate the new offset value for the received mobile application according to the retrieved stored fingerprint comprises calculating a hash value for the received mobile application.

19. The computer program product of claim 17, wherein the set of instructions that when executed by the processor of the mobile computing device causes the mobile computing device to calculate the new offset value for the received mobile application according to the retrieved stored fingerprint comprises calculating the offset value by using metadata of the received mobile application.

20. The computer program product of claim 17, wherein the set of instructions that when executed by the processor of the mobile computing device causes the mobile computing device to request deployment of the mobile application comprises requesting deployment of the mobile application from a distributed mobile application repository.

* * * * *